June 5, 1956   J. M. ALEXANDER   2,748,640
DEVICE FOR OPERATING VALVES
Filed May 12, 1954
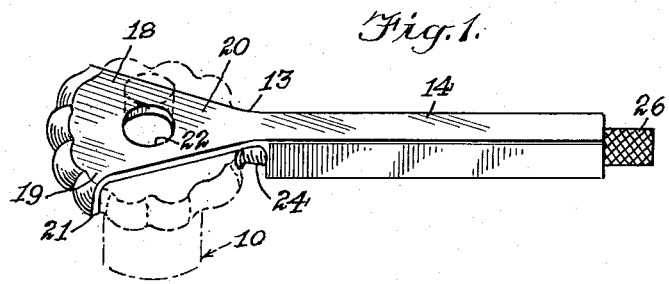
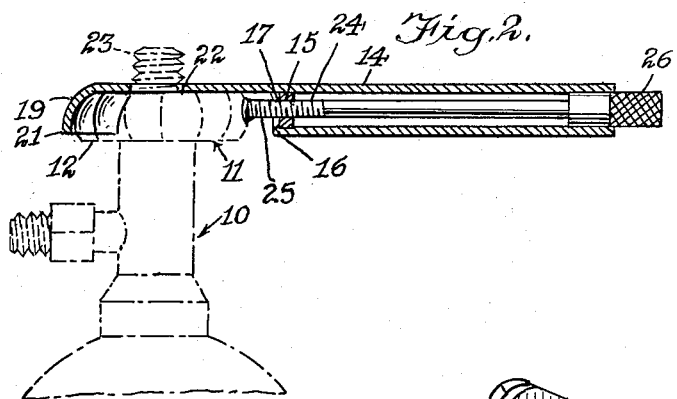
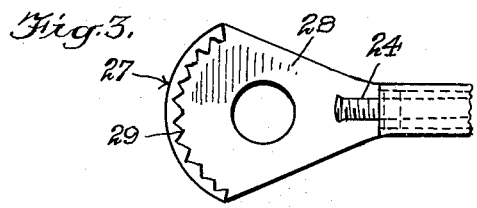
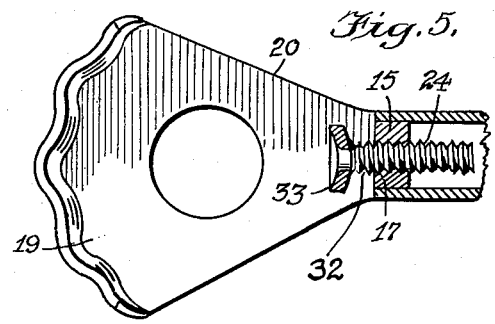
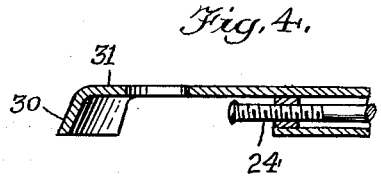
INVENTOR
John M. Alexander
BY
Munn, Liddy, Nathanson & March
ATTORNEY

United States Patent Office 2,748,640
Patented June 5, 1956

2,748,640

DEVICE FOR OPERATING VALVES

John M. Alexander, Hamden, Conn.

Application May 12, 1954, Serial No. 429,325

2 Claims. (Cl. 81—175)

This invention relates to a valve operator and more particularly to a device for operating valves of oxygen tanks, helium tanks, argon tanks, and the like.

Heretofore great difficulty has been encountered in opening and closing valves on oxygen tanks, helium tanks, argon tanks, and the like, which difficulty was caused by the size of the hand wheel of the valve on such tanks, the configuration thereof and the extremely tight locking fit of the valve on such a tank necessitated to prevent the escape of the gases within the tank. In attempting to open such valves, pliers, wrenches, and the like are normally used. However, because of the tight fit as aforesaid, the teeth on the pliers or wrenches are often stripped and a great amount of energy must be expended in order to open the tightly secured valve. In addition, because of the construction of the valve itself, which is normally in the shape of a sinusoidal circle, a friction grip could not be maintained between the pliers or other holding means and the valve.

It is an object of the present invention to provide a device for operating valves of the character described without use of abnormal pressure.

It is a further object of the present invention to provide a device for operating valves of the character described which is of strong construction and will will firmly grip the valve without twisting or turning relative thereto.

It is still a further object of the present invention to provide a device for operating valves of the character described which is adaptable for use with valves of various dimensions and shapes.

It is still a further object of the present invention to provide a device for operating valves of the character described having all of the desired advantages, but which is nevertheless inexpensive to manufacture and easy to construct.

These and other advantages of the present invention appear in greater detail in the accompanying specification taken in conjunction with the accompanying drawings, in which:

Fig. 1 is a perspective view of the device for operating valves made in accordance with the present invention;

Fig. 2 is a horizontal sectional view of the device for operating valves made in accordance with the present invention;

Fig. 3 is a modified form of the device of the present invention;

Fig. 4 is another modified form of the device of the present invention; and

Fig. 5 is still another modified form of the device of the present invention.

Referring to the drawings, there is shown for exemplary purposes, an oxygen tank having a valve 10 which is tightly fitted on the top of the tank to provide a seal tight closure and is provided with a hand wheel 11. The outer perimeter 12 of the hand wheel of the valve 10, as shown, is of sinusoidal circular shape. Heretofore in the operation of such valves to open and close the same, it has been found necessary to use pliers, wrenches, or the like. However, because of the shape of the outer perimeter and because of the seal tight fit, these instruments did not function properly and efficiently. According to the present invention, however, there is provided, as shown in operative position, a device 13 comprising a flat metal plate, part of which is bent back to provide a tubular portion 14. A square disk 15, whose dimensions are substantially the same as the dimensions of the inner perimeter of the tubular portion 14, is secured in the inner end 16 of the tubular portion preferably in such fashion that the outer surface of the disk is flush with the inner edge of the tubular portion. The disk 15 is provided with a threaded opening 17 for the purposes hereinafter set forth. Adjacent the tubular portion there is provided a head portion 18 which is so constructed that its outer extremity 19 is wider than the extremity 20 immediately adjacent the tubular portion. The outer extremity 19 of said head portion is bent over to provide a shoulder 21. The shoulder 21 is depressed at predetermined points to provide a sinusoidal semi-circular configuration, as shown, which substantially conforms to the configuration of the outer perimeter of the hand wheel 11 of the valve 10. The head 18 has a central opening 22 into which the stem 23 of the valve 10 may be inserted so that the extension will interfere with the operation of the device.

A threaded bolt 24 is inserted in and carried by the tubular portion 14 of the device with its inner end 25 screwed into the threaded opening 17 in the disk 15. The outer end 26 of the threaded bolt is preferably of enlarged shape to substantially fill the cavity at the outer end of the tubular portion 14. As shown, the said enlarged end of the threaded bolt is preferably serrated to prevent its slipping from the hand wheel of the valve 10 when grasped during adjustment of the bolt 24 as hereinafter described.

After the bolt 24 is inserted into the tubular portion 14 through the threaded opening 17 in the disk 15, the inner extremity thereof is turned over against the disk 15 so that the bolt 24 may not be removed from the tubular portion 14. This construction is advantageous in that the bolt cannot be lost from the complete device as might be the case if it was removable at will from the tubular portion.

To operate the device, it is only necessary to place the head portion 18 over the hand wheel of the valve 10 of the oxygen tank or the like, with the stem 23 on the valve riding in the central opening 22 in the opening in the head portion. The device is so constructed that the sinusoidal shoulder 21 will engage the sinusoidal outer perimeter 12 of the hand wheel of the valve 11. The bolt 24 is then urged against that extremity of the hand wheel which is opposite to the sinusoidal shoulder 21, as shown, to tightly fasten the device in place. Thereafter only slight pressure need be exerted in the proper direction to operate the valve. It is to be noted that because of the construction presented by this invention, the bolt 24 will not break off because of its confinement and support within the tubular portion 14. This is an extremely important feature for in the absence of such construction and provision for support, the bolt would normally have a tendency to break under such pressure. With the construction set forth, however, the area upon which the pressure is placed on the tube is distributed. The device is adjustable to fit valve hand wheels of various sizes for it is only necessary to screw the bolt inwardly to reduce the space between the inner extremity 25 of the bolt and the shoulder 21 for smaller caps and unscrew the bolt to provide greater space between the inner extremity 25 of the bolt and the sinusoidal shoulder 21. By this construction there is provided an extremely efficient, workmanlike and strong device of the character described whose shoulder portion conforms to the usual shape of the outer perimeter of the hand wheel of the valve of an oxygen tank or the like and wherein danger of breakage to the bolt is eliminated because of its confinement and support within a rigid tube.

The preferred construction of the device is as described of one piece of flat metal shaped as defined so that there are no weak spots, however it will be realized that two or more pieces may be utilized to obtain the desired construction.

In Fig. 3 a modified form of the present invention is shown which functions in the same advantageous manner as the device shown in Fig. 1. The shoulder 27 bent over from the head 28 of the device shown in this modification, however, is provided at its inner side with serrations or teeth 29 which will effectively grip the outer perimeter of the hand wheel of the valve. This modification is especially useful when the hand wheel has a completely circular outer perimeter rather than the sinusoidally shaped outer perimeter, as shown in Fig. 1. The operation of the device is the same as the device shown hereinbefore and it will be understood that the teeth 29 on the inner side will assist in gripping the hand wheel firmly and prevent the cap from turning relative thereto.

In the modification shown in Fig. 4, the shoulder 30 on the head 31 of the device is, as shown, of angular shape to fit valve hand wheels whose outer perimeter is angularly shaped. The operation of the device in this modified form is identical with the operation of the device shown in Figs. 1–3. It will be understood that the shaped shoulder may be so constructed as to fit square hand wheels, triangular hand wheels, hexagonal hand wheels, etc.

In the modification of the present device shown in Fig. 5, a device of similar construction to that shown in Fig. 1 is disclosed. However, the inner extremity 32 of the bolt in this modification is not bent over but instead a plate 33 is secured thereto to provide greater surface area for contact against the hand wheel of a valve. The plate 33 also provides a stop to prevent the bolt from being removed from the tubular portion.

It will be understood that while the device of this invention has been shown in specific form, that other forms may be utilized. For example, the tubular portion which is disclosed as a substantially square tube, may be circular or of any other shape if desired, or the particular shape of the head and bolt may be changed. Thus variations and modifications may be made without departing from the spirit of the invention or the scope of the appended claims.

I claim:
1. A wrench designed for actuating the valve of an oxygen tank comprising a sector-shaped plate having a hollow handle portion extended rearwardly therefrom, the major cross-sectional area of said handle portion lying below the plane of said plate; an angularly offset flange portion on said plate provided with a configuration for nesting against a corresponding configuration of the hand wheel of the valve, an adjustable screw clamp mounted in the hollow handle portion, in opposition to the flange portion of the plate, whereby the spacing between the flange portion of the plate and the face portion of the screw clamp may be adjusted to actuate valves having variable size hand wheels.

2. A wrench designed for actuating the valve of an oxygen tank, said oxygen tank having a shaft extending from the top portion thereof, said wrench comprising a sector-shaped plate having an opening through which said shaft may extend, said opening being of substantially the same diameter as the outer diameter of said shaft, said plate having a hollow handle portion extended rearwardly therethrough, the major cross-sectional area of said handle portion lying below the plane of said plate; an angularly offset flange portion on said plate provided with a configuration for nesting against a corresponding configuration of the hand wheel of the valve, an adjustable screw clamp mounted in the hollow handle portion, in opposition to the flange portion of the plate, whereby the spacing between the flange portion of the plate and the face portion of the screw clamp may be adjusted to actuate valves having variable size hand wheels.

References Cited in the file of this patent

UNITED STATES PATENTS

| | | |
|---|---|---|
| 443,312 | Bode | Dec. 23, 1890 |
| 1,505,896 | Kershner | Aug. 19, 1924 |
| 1,620,739 | Presho | Mar. 15, 1927 |
| 2,051,427 | Snavely | Aug. 18, 1936 |
| 2,506,373 | McClain | May 2, 1950 |
| 2,623,418 | Vaughan | Dec. 30, 1952 |

FOREIGN PATENTS

| | | |
|---|---|---|
| 8,700 | Great Britain | May 11, 1900 |
| 9,928 | Great Britain | Apr. 28, 1906 |
| 79,314 | Switzerland | Nov. 1, 1918 |